(12) United States Patent
Winkler

(10) Patent No.: US 7,628,563 B2
(45) Date of Patent: Dec. 8, 2009

(54) FITTING FOR A T-SLOT STRUCTURE

(76) Inventor: John M. Winkler, S86 W32310 Elias Ct., Mukwonago, WI (US) 53149-8634

( * ) Notice: Subject to any disclaimer, the term of this patent is extended or adjusted under 35 U.S.C. 154(b) by 509 days.

(21) Appl. No.: 11/724,865

(22) Filed: Mar. 16, 2007

(65) Prior Publication Data
US 2008/0222990 A1    Sep. 18, 2008

(51) Int. Cl.
*E04B 9/16* (2006.01)

(52) U.S. Cl. ............ 403/387; 403/263; 52/656.9; 211/189; 312/265.4

(58) Field of Classification Search ........... 52/656.9, 52/279, 278, 280; 403/387, 231, 263; 312/265.4, 312/265.1, 265.2; 211/189
See application file for complete search history.

(56) References Cited

U.S. PATENT DOCUMENTS

| | | | | |
|---|---|---|---|---|
| 4,768,845 A | * | 9/1988 | Yeh ............... | 312/257.1 |
| 5,212,915 A | | 5/1993 | Antonio | |
| 5,345,737 A | * | 9/1994 | Latchinian ........... | 52/280 |
| 5,729,948 A | * | 3/1998 | Levy et al. .......... | 52/656.9 |
| RE36,226 E | | 6/1999 | Antonio | |
| 5,997,117 A | * | 12/1999 | Krietzman ........... | 312/265.4 |
| 6,192,592 B1 | | 2/2001 | Zimmerman | |
| 6,223,917 B1 | * | 5/2001 | Bruder ............... | 211/189 |
| D473,078 S | | 4/2003 | Haberman | |
| 6,857,712 B1 | | 2/2005 | Haberman | |
| 6,986,556 B2 | | 1/2006 | Haberman | |
| 7,125,088 B2 | | 10/2006 | Haberman | |
| 7,264,416 B2 | * | 9/2007 | Kahl ............... | 403/187 |
| 2004/0165796 A1 | | 8/2004 | Longhurst | |

* cited by examiner

*Primary Examiner*—Richard E Chilcot, Jr.
*Assistant Examiner*—Chi Q Nguyen
(74) *Attorney, Agent, or Firm*—Ryan Kromholz & Manion S.C.

(57) ABSTRACT

A unitary fitting for mating with and coupling a plurality of T-slot structures. The fitting comprises at least two sections to mate with the T-slot structures, with each of the sections having a first end, a second end, an outer surface circumferentially surrounding said T-slot structure, and an inner surface being capable of mating with one of said T-slot structures. the inner surfaces has at least one rail that extends inwardly into a recess of the T-slot structures. The fitting is formed of one piece construction.

20 Claims, 5 Drawing Sheets ional brace and they do not necessarily follow the contour sufficiently of the extrusion for gripping purposes.

FITTING FOR A T-SLOT STRUCTURE

BACKGROUND OF THE INVENTION

The present invention relates to braces and fittings for use with "T-slot" aluminum structures. T-slot structures are also referred to as extrusions or extrusion structures. The fittings are used in building and constructing various mechanical structures and modular structures. Using T-fittings or extrusions in building structures and the like allows for structures to be erected quicker and easier than prior art structures. Also, because extrusions are connected with braces or fittings, mechanical stress on the structures is reduced.

Generally, prior art fittings and braces either consist of two or more sections that would be clamped together around the extrusion to hold the extrusion in place. The sections are secured to one another to enclose an end of the extrusions and then may be further secured to the extrusion with the use of pins, bolts, or other securing devices. These structures require preassembling, which increases the time needed for erecting a structure and increases the chance of improperly aligned and fitted extrusions. These devices leave further room for improvement if extrusions are to be attached in more than one direction, such as for corner arrangements. Extrusions have the potential to move or slide within these types of braces and fittings, as the pins and similar securing means may not adequately hold the brace to the extrusion.

Other prior art braces have been developed that provide for the extrusion members to be inserted into braces that are capable of forming corner structures for the extrusion members. An example of such a device can be found in Wood, U.S. Pat. No. 6,481,177, which allows for two extrusions to be attached to one another in a perpendicular arrangement. These structures allow for potential movement of the extrusion within the brace, as they do not necessarily follow the contour sufficiently of the extrusion for gripping purposes. That is, the braces generally tend to be sized for the most outer perimeter of the extrusions and generally are capable of accommodating only one size or shape of an extrusion. While capable of forming a corner connection, these devices still are time consuming when assembling or erecting a structure using T-slot extrusions. Further, these devices do not lend themselves to being adapted for various uses and angles that can be encountered when erecting a structure. For example, such braces are generally not capable of easily connecting more than two extrusions together, as would be necessary for making a three-dimensional corner. Two or more braces may be used together, but time must then be taken to properly align all three extrusions.

Thus, it would be advantageous to design a simple fitting for an extrusion or T-slot structure that could be adapted for a variety of uses. The fitting would be used to quickly form corner structures in two or three planes, quickly and with little required alignment of the extrusion pieces. The fitting could also be used to secure the extrusion at any length along the extrusion. That is, the fitting could be adapted for use as a corner brace or fitting to a center fitting or support. Such a device would result in improved efficiency and a reduction in assembly time.

SUMMARY OF THE INVENTION

The present invention is an improved fitting for T-slot fittings or T-slot extrusions that provides for easier and quicker assembly processes than previous fittings. The fitting surrounds the T-slot structure on all sides, with each side having a railing that will extend into the respective side of the T-slot structure. The fittings may allow the extrusions to pass entirely through the fitting, or may have an enclosed end wall and only one entry point. Alternatively, the fitting may have an open or hinged side or connected to another device on one side, depending on the specific use. The fittings may also be designed as corner fittings for connecting extrusions in two, three, or more directions.

The railings preferably are arranged to fit together with the extrusions in a relatively tight mating fashion. The railings can run the entire length of the fitting or could be located at predetermined sections of the fitting. Also, the railings could extend the entire height of each recess formed on each side of the T-fitting, or extend only partially into each side of the fitting. The fittings could be mounted onto the extrusions with any known mounting methods, such as welding, pinning, drilling, drilling and riveting, drilling and tapping blind or through a threaded fastener, or drilling and fastening with another threaded device.

The present invention is a fitting for a T-slot structure that surrounds the T-slot structure or extrusion on a plurality of sides and has a rail extending into the opening formed on at least one of the sides of the extrusion. The fitting of the present invention is also a unitary or single-piece design. Known prior art structures did not have rails that extended inwardly of the extrusion and/or were not designed as single pieces.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
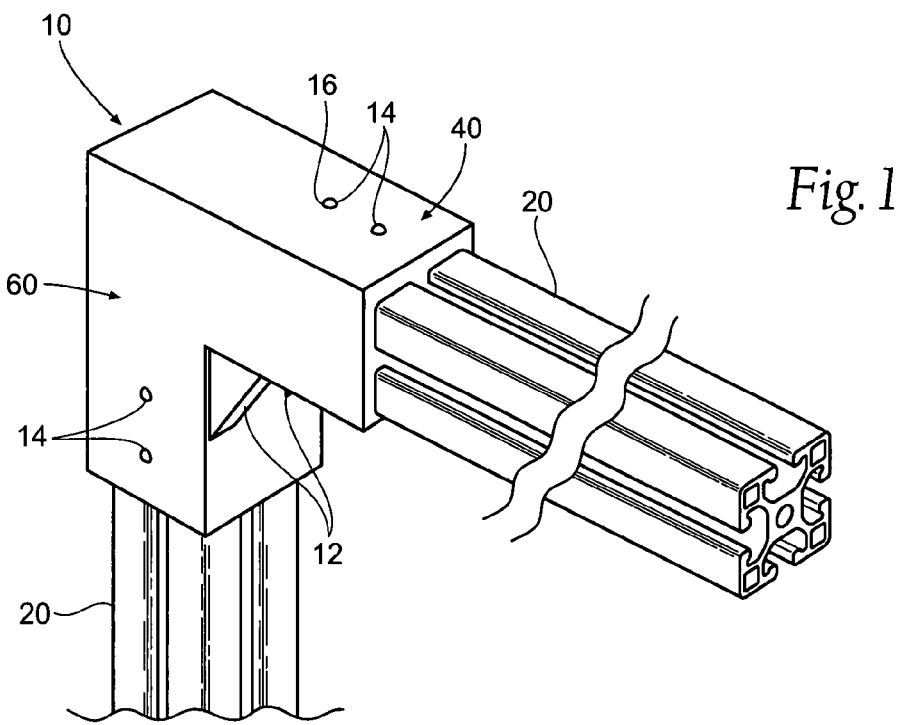
FIG. 1 is a perspective view of a fitting according to the present invention mating with a T-slot structure.

FIG. 1 provides a perspective view of a fitting 10 for securing together and mate T-slot structures or T-slot extrusions 20. The fitting 10 generally comprises a first mating section 40 and a second mating section 60. Preferably, a corner brace 12 adds support for the fitting 10. The corner brace 12 can also be used for mounting purposes, such as for mounting a sheet of Plexiglas®, metal plating, screening, guarding, or possibly a decorative piece of material. It is not necessary, though, for the brace 12 to be situated on the fitting 10 to carry out the present invention. The fitting 10 and extrusions 20 are arranged so that the extrusions 20 are fittingly inserted into the fitting 10. However, various additional mounting devices can be used to permanently or releasably secure the fitting 10 to the extrusions 20. For instance, FIG. 1 shows pins or screws 14 being inserted into holes 16 sufficiently far enough to engage the surface of the extrusion 20.

Figure 2:
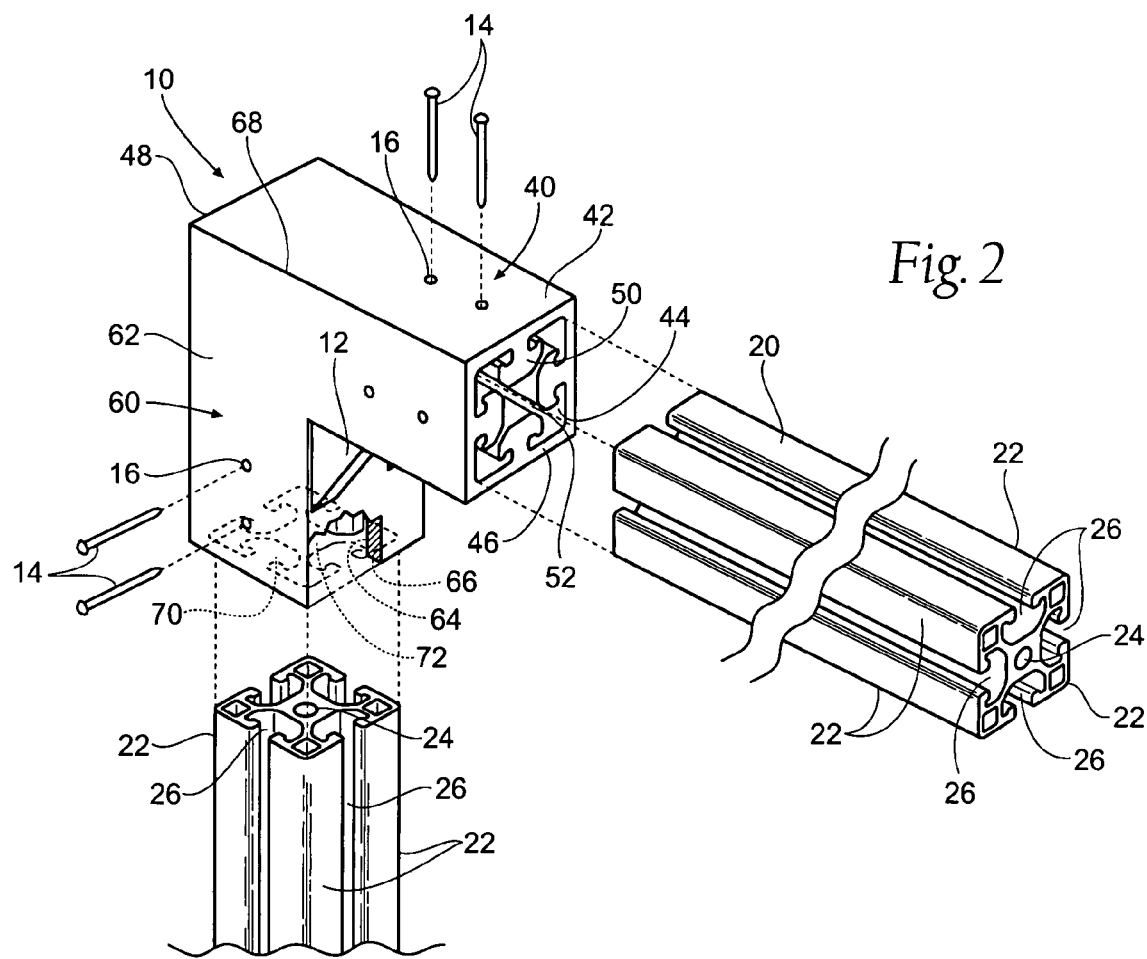
FIG. 2 is an exploded perspective view of the fitting and T-slot structure of FIG. 1.

FIG. 2 provides an exploded view of the fitting 10 and extrusions 20 shown in FIG. 1. The extrusions 20 are shown as being rectangular in shape, but could be any desired shape, such as hexagonal shapes. The extrusions 20 have a symmetrical design, having a plurality of raised or extended corners 22 extending from a central spine 24, with a plurality of recesses 26 located between each pair of corners 22. It is understood that reference to one of the extrusions 20 will refer to each of the extrusions 20.

The first mating section 40 is generally comprised of an outer surface 42 arranged to circumferentially surround the extrusion 20 and an inner surface 44 having portions or railings 50 that are designed to extend inwardly of the recesses 26 and fittingly mate with the recesses 26 of the extrusion 20. The inner surface 44 and the railings 50 preferably generally follow the contours of the extrusion 20, but it is not necessary for the inner surface 44 to necessarily fittingly engage the surface of the extrusion 20. For example, if a nut with a threaded fastener is used to as securing means, the railing 50 could have a short height and extend the entire length of the mating section 40. Railings 50 that extend the entire height of the recess may be used with securing means where drilling, pinning, or tapping is used to connect the fitting 10 to the extrusion. Likewise, the railing could be T-slot shaped, generally being shaped as that of the recess (as shown in FIG. 2).

The first mating section 40 has a first end 46 and a second end 48. The railing 50 can extend the entire length of the mating section from the first end 46 to the second end 48, or only a portion thereof. Likewise, the railings 50 can extend inwardly entirely to the surfaces of the recesses 26, or extend inwardly into the recesses 26, but not entirely to the surfaces of the recesses 26. The height of the railing 50 is generally be determined by the type of fastener used to secure the fitting 10 to the extrusion 20. The extrusion 20 will be inserted into the opening 52 formed at the first end 46 of the first mating section 40, but it will be shown that the first mating section 40 may be designed so that extrusion 20 could also be inserted into the second end 48, or be inserted and pass through both ends 46, 48 of the mating section 40.

Still referring to FIG. 2, the second mating section 60 is shown partially cut away. The second mating section 60 generally comprises an outer surface 62 arranged to circumferentially surround the extrusion 20 and an inner surface 64 having portions or railings 70 that are designed to extend inwardly of the recesses 26 and fittingly mate with the recesses 26 of the extrusion 20, in the same fashion as was described with the first mating section 40. The second mating section 60 also comprises a first end 66 and a second end 68, as is the case with the first mating section 40, and can be arranged to mate and receive the extrusion 20 through an opening 72, as well. The mating section 60 can be sized and configured as described with the mating section 40. That is, the height and width of the railings 70 can vary within the area of the recesses 26 of the extrusions 20.

Generally, the extrusion 20 will be inserted only a predetermined distance into the fitting 10 and not the complete length of the fitting 10. For instance, the extrusion 20 would only be inserted a few inches into the opening 52 and not entirely into the opening to the second end 48. This allows the fitting 10 to be adapted to receive more extrusions 20 in various directions or allow for addition of other features, such as castors or other external devices. Such arrangements will become apparent with following description, more specifically the description with respect to FIGS. 4-8.

Figure 3:
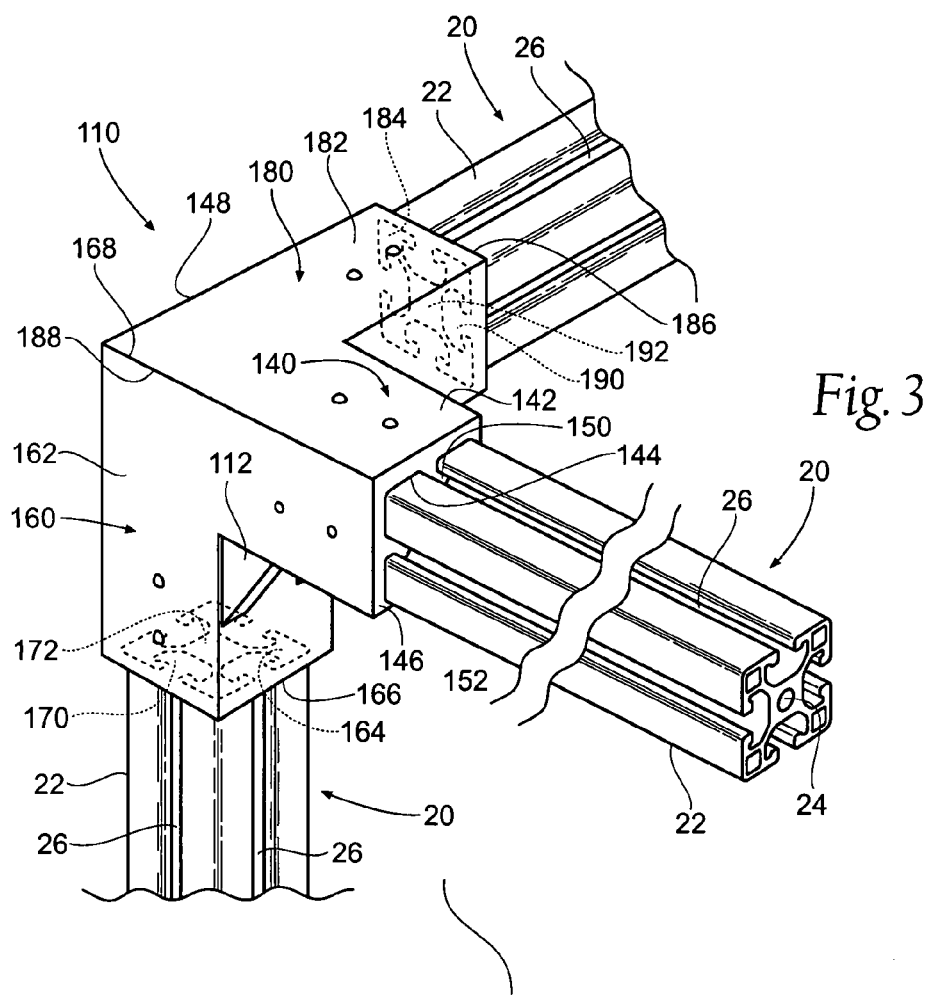
FIG. 3 is a perspective view of a second embodiment of a fitting according to the present invention.

FIG. 3 shows a second embodiment 110 of a fitting according to the present invention. The shape and function of the individual matting sections is similar to that described with respect to the mating sections 40, 60 of the fitting 10 (see FIGS. 1 and 2). The fitting 110 is designed similarly to that of the fitting 10, except that there are three separate mating sections. The fitting 110 generally comprises a first mating section 140, a second mating section 160 and a third mating section 180. Corner braces 112 can be used to give further stability to the fitting 110.

The first mating section 140 is generally comprised of an outer surface 142 arranged to circumferentially surround the extrusion 20 and an inner surface 144 having portions or railings 150 that are designed to extend inwardly of the recesses 26 and fittingly mate with the recesses 26 of the extrusion 20. The first mating section 140 has a first end 146 and a second end 148. The railing 150 can extend the entire length of the mating section from the first end 146 to the second end 148, or only a portion thereof. Likewise, the railings 150 can extend entirely to the surfaces of the recesses 26, or extend into the recesses 26, but not entirely to the surfaces of the recesses. The extrusion 20 will be inserted into the opening 152 formed at the first end 146 of the first mating section 140, but it will be shown that the first mating section 140 may be designed so that extrusion 20 could also be inserted into the second end 148.

Still referring to FIG. 3, the second mating section 160 generally comprises an outer surface 162 arranged to circumferentially surround the extrusion 20 and an inner surface 164 having portions or railings 170 that are designed to extend inwardly of the recesses 26 and fittingly mate with the recesses 26 of the extrusion 20, in the same fashion as was described with the first mating section 140 (and the mating sections 40, 60 of the fitting 10). The second mating section 160 also comprises a first end 166 and a second end 168, as is the case with the first mating section 140, and can be arranged to mate and receive the extrusion 20 through an opening 172, as well.

The third mating section 180 is also arranged similarly to the first two mating sections 140, 160. The mating section 180 generally comprises an outer surface 182 arranged to circumferentially surround the extrusion 20 and an inner surface 184 having portions or railings 190 that are designed to extend inwardly of the recesses 26 and fittingly mate with the recesses 26 of the extrusion 20, in the same fashion as was described with the first mating section 140. The third mating section 180 also comprises a first end 186 and a second end 188, as is the case with the first mating section 140, and can be arranged to mate and receive the extrusion 20 through an opening 192, as well.

Figure 4:
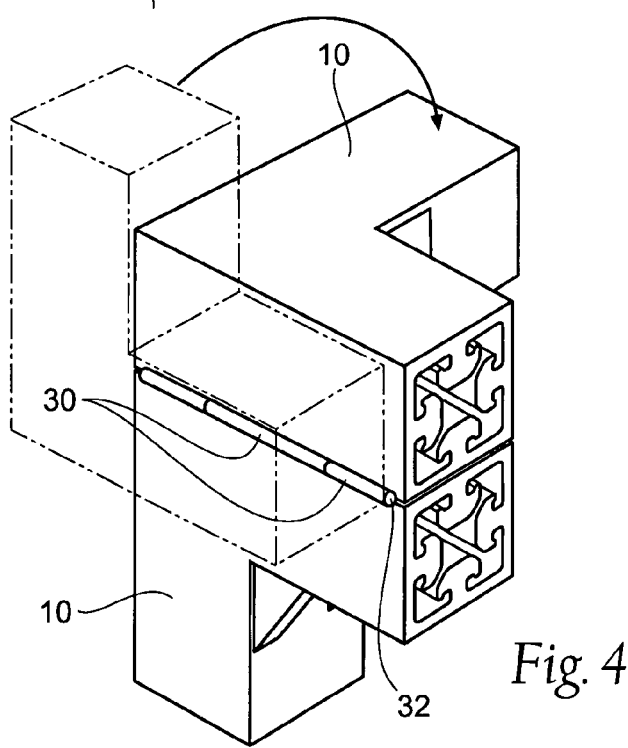
FIG. 4 is a perspective view of the fitting of FIG. 1 further comprising an exterior hinge.
Figure 5:
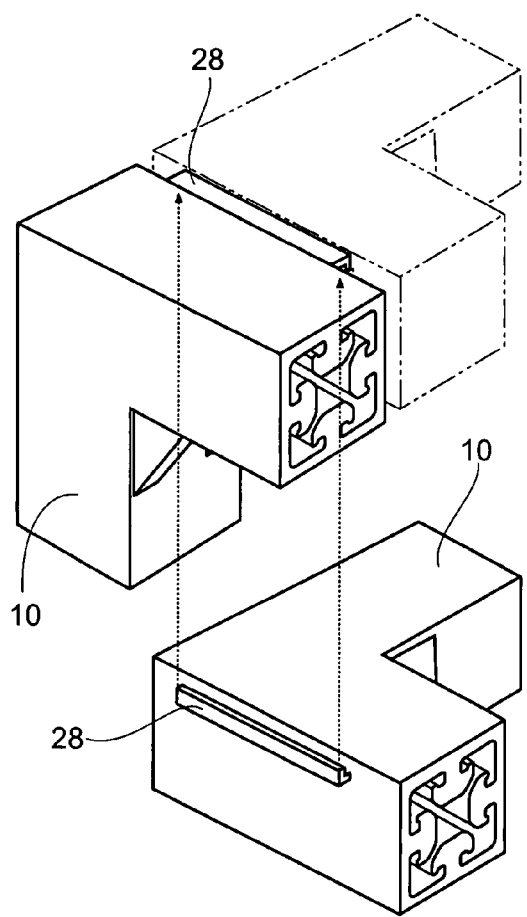
FIG. 5 is a perspective view of the fitting of FIG. 1 further comprising an exterior latch.
Figure 6:
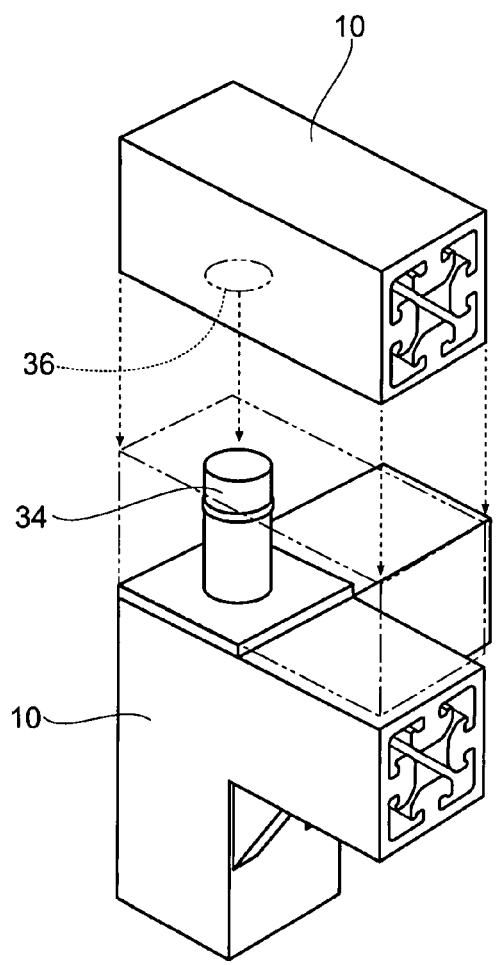
FIG. 6 is a perspective view of the fitting of FIG. 1 further comprising an exterior post.

FIGS. 4-6 demonstrates various means for mounting an exterior object onto the fitting 10 of FIGS. 1 and 2. The mounting means could also be incorporated in the fitting 110, as well, or with any other fitting that would fall within the scope of the present invention. As shown, the exterior object is another fitting 10, but it is understood that the mounting means could be used to mount other objects on the fitting. FIG. 4 shows the use of a pair of hinge members 30 and a pin 32 to rotatably secure two fittings 10 together. FIG. 5 provides for a latch 28 that will secure two fittings 10 together. FIG. 6 shows a post 34 located on a first fitting 10 that will be received by a female insert 36 located on a second fitting 10. It is understood that the mounting means shown and described in FIGS. 4-6 are merely exemplary of possible mounting means and should not be considered as limiting the scope of the invention to any specific arrangement. It is also understood that more than one mounting means may be located on an individual fitting 10.

Figure 7:
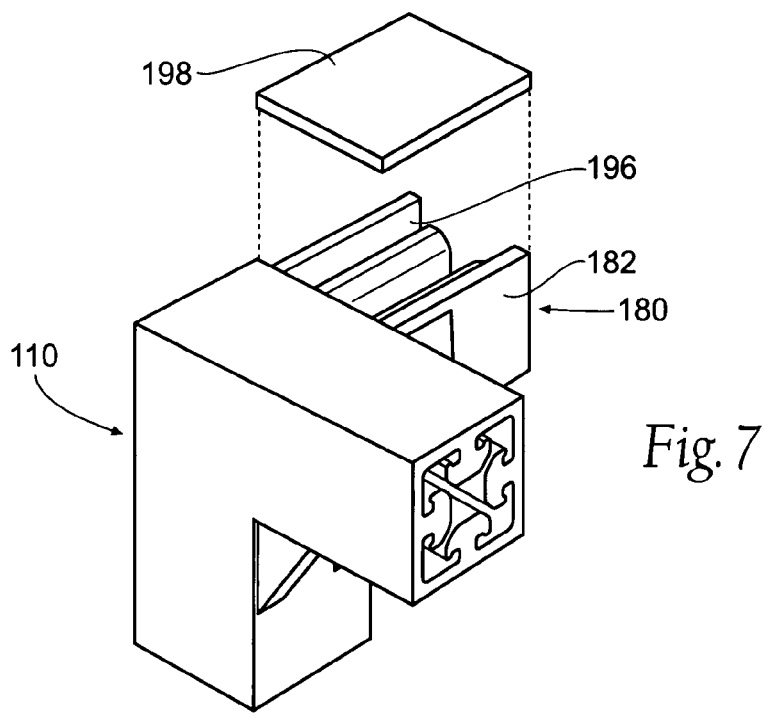
FIG. 7 is a perspective view of the fitting of FIG. 3 having an exposed surface for one of the mating sections.

FIG. 7 shows the fitting 110 being slightly altered. The third mating section 180 is shown with the outer surface 182 having an open side 196. The open side 196 allows for access to the extrusion 20 after it has been inserted into the mating section 180. The outer surface 182 could be further enclosed with a cover 198, which could be pivotally or hingedly connected to the mating section 180 or completely removable from the mating section 180. Either arrangement would fall under the scope of the present invention and could be designed as is known to one being skilled in the art.

Figure 8:
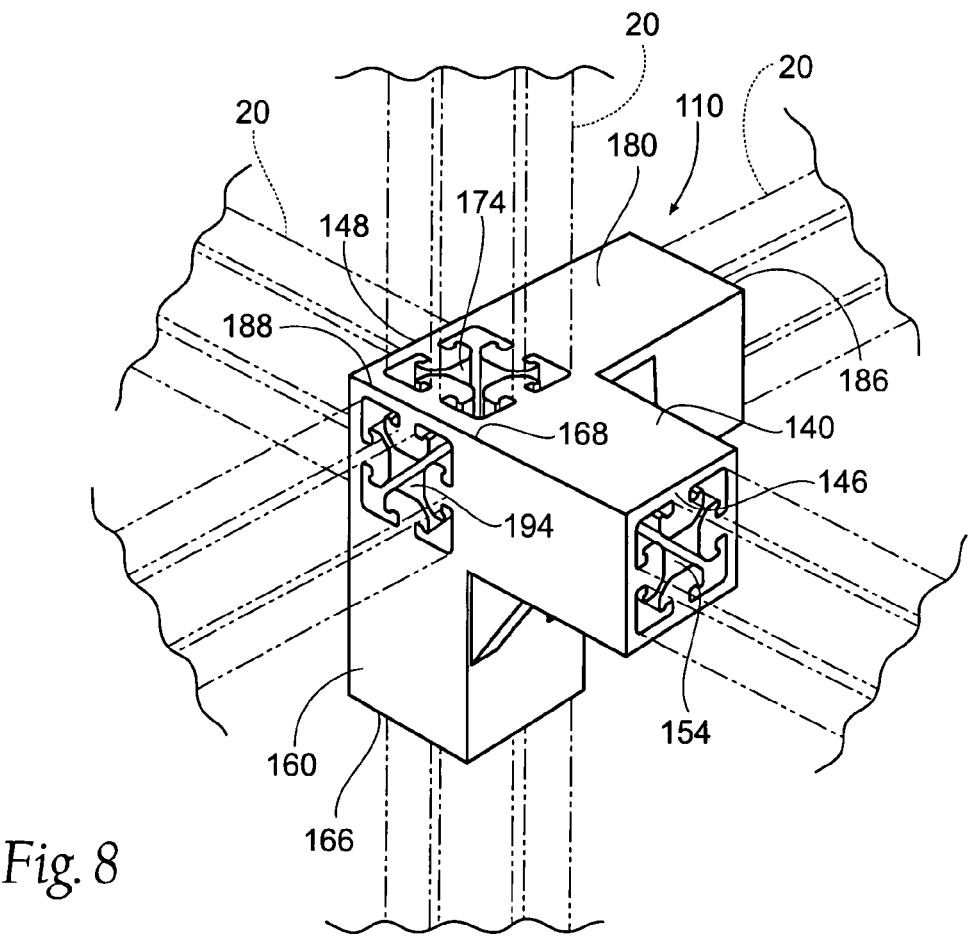
FIG. 8 is a perspective view of the fitting of FIG. 3 demonstrating a plurality of through bores located in the fitting.

FIG. 8 shows a further arrangement of the fitting 110 each of the mating sections 140, 160, 180 comprises a through bore, 154, 174, 194, respectively. That is, the second ends 148, 168, 188 of the mating sections 140, 160, 180 are open, thereby allowing an extrusion 20 to pass completely through the mating sections 140, 160, 180, if necessary. This is advantageous in certain arrangements where extrusions of longer lengths need extra stabilization at certain critical load bearing points. It is understood that the fitting 110 can be designed with one or more throughbores 154, 174, or 194, and that a throughbore could also be incorporated into the fitting 10. It is also possible that each of the respective ends 148, 168, 188 could form openings, but not necessarily form throughbores. That is, each of the six shown openings could be configured to receive an extrusion 20, with a wall or other abutment formed within the fitting 110 that would give the extrusions 20 a solid surface to be inserted against.

Figure 9:
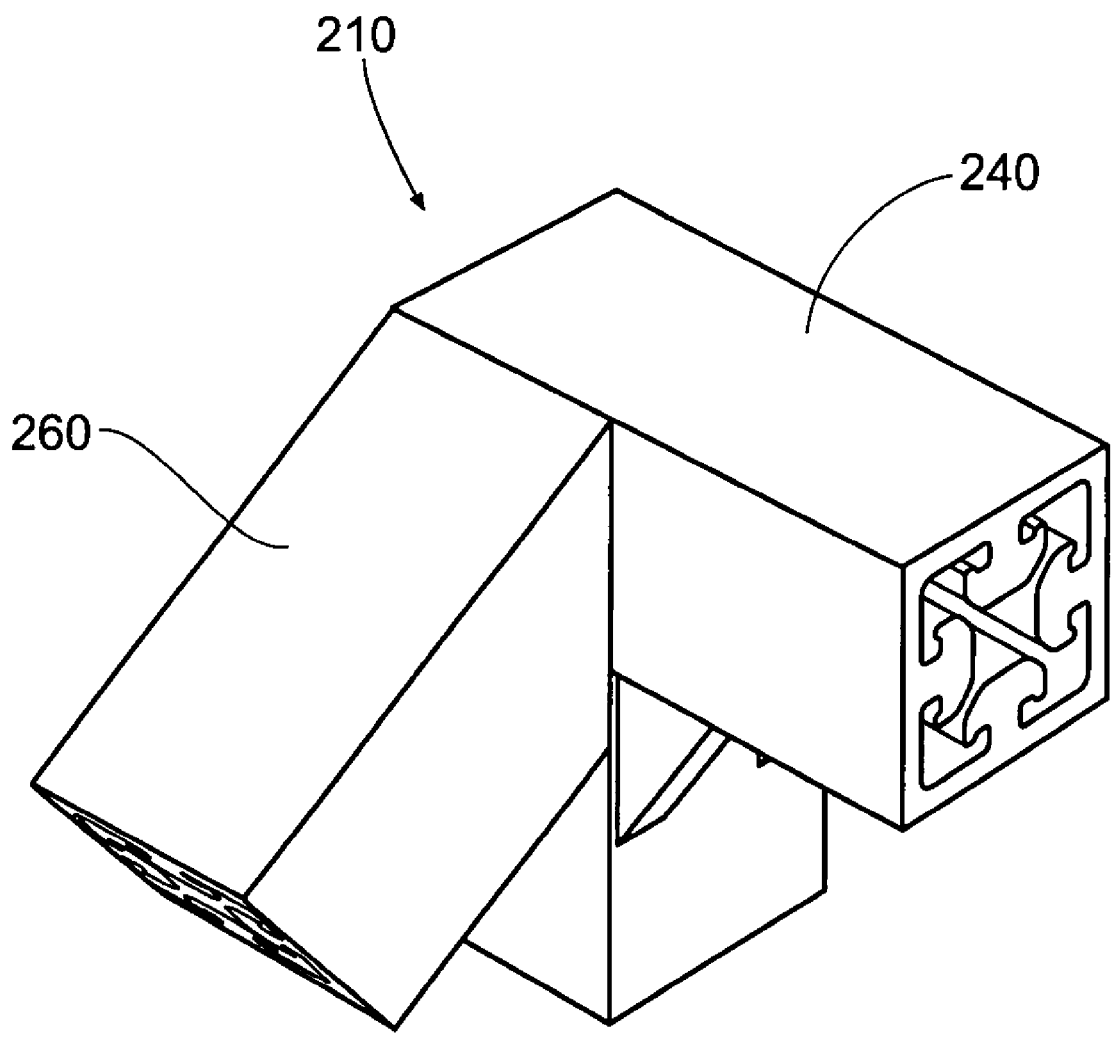
FIG. 9 provides a perspective view of another embodiment of a fitting according to the present invention.

The various mating sections are usually arranged at 90° angles with respect to one another. However, the mating sections 40, 60 or 140, 160, 180 can form other angles that are not right angles. As an example, FIG. 9 shows the fitting 110 wherein the mating section 160 is angled at approximately 45° with respect to the mating section 140. Provided that a unitary, one-piece fitting comprises at least two mating sections as described herein, the angle between the mating sections can be altered and still fall within the scope of the present invention. That is, the angle between the mating sections, whether there are two three, or more mating sections, can greater or less than 90° and fall within the present invention. Provided the various mating sections are situated in different planes, the fitting would fall within the scope of the present invention. Similarly, FIG. 9 further demonstrates that the present invention is capable of mating extrusions in two, three, or more, directions.

The present invention provides a universal fitting for use with various sizes of extrusions. Manufacturers design and manufacture extrusions at differing sizes. Two common sizes have widths of 1½" and 1⅝" for the extrusions. Prior art fittings would require two separate sizes of fittings to accommodate these fittings, and possibly different fittings for other sized extrusions. The present invention can accommodate various sized extrusions without requiring multiple fittings. The outside of the fittings would not change, and the inside surface may be altered to accommodate the differing fittings, but because the fitting is designed with a portion extending inwardly into the recesses of the mated extrusion, minimal, if any, adapting is necessary.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A unitary fitting mate and couple with a plurality of T-slot structures, said T-slot structures forming a plurality of recesses, said fitting comprising:
   a first mating section comprising:
   a first end;
   a second end;
   an outer surface circumferentially surrounding a portion thereof of said T-slot structure; and
   an inner surface being capable of mating with one of said T-slot structures, said inner surface having a portion thereof extending inwardly into at least one of said recesses of a respective T-slot structure;
   a second mating section comprising:
   a first end;
   a second end;
   an outer surface circumferentially surrounding a portion thereof of said T-slot structure; and
   an inner surface being capable of mating with one of said T-slot structures, said inner surface having a portion thereof extending inwardly into one of said recesses of a respective T-slot structure; and
   wherein said first section and said second section are of unitary, one piece construction.

2. The fitting according to claim 1, wherein said outside surface of one of said sections further comprises a portion hingedly connected to said outside surface of said section.

3. The fitting according to claim 1, wherein one of said sections further comprises a throughbore.

4. The fitting according to claim 1 wherein said first section and said section form substantially a 90° angle with respect to one another.

5. The fitting according to claim 1 further comprising a third mating section angled with respect to said first section and said second section.

6. The fitting according to claim 1 further comprising means for securing said fitting to said T-slot structures.

7. The fitting according to claim 1 further comprising means for mounting an exterior object onto said fitting.

8. A unitary fitting mate and couple with a plurality of T-slot structures, said T-slot structures forming a plurality of recesses, said fitting comprising:
   a first mating section comprising:
   a first end;
   a second end;
   an outer surface circumferentially surrounding a portion thereof of said T-slot structure; and
   an inner surface being capable of mating with one of said T-slot structures, said inner surface having a portion thereof extending inwardly into at least one of said recesses of a respective T-slot structure;
   a second mating section comprising:
   a first end;
   a second end;
   an outer surface circumferentially surrounding said T-slot structure; and
   an inner surface being capable of mating with one of said T-slot structures, said inner surface having a portion thereof extending inwardly into at least one of said recesses of a respective T-slot structure; and
   wherein said first section and said second section are angled relative to one another.

9. The fitting according to claim 8 wherein said first mating section and said second mating section form a 90° angle with respect to one another.

10. The fitting according to claim 8 wherein said first mating section and said second mating section form a 45° angle with respect to one another.

11. The fitting according to claim 8 further comprising means for securing said fitting to said T-slot structures.

12. The fitting according to claim 8 further comprising means for mounting an exterior object onto said fitting.

13. The fitting according to claim 12 wherein said mounting means further comprises a hinge structure, said hinge structure capable of mating with a hinge structure of a corresponding fitting.

14. The fitting according to claim 12 wherein said mounting means further comprises a latch, said latch capable of mating with a latch of a corresponding fitting.

15. The fitting according to claim 12 wherein said mounting means further comprises a post.

16. The fitting according to claim 8 further comprising means for securing said fitting to said T-slot structure.

17. The fitting according to claim 8 wherein one of said mating sections comprises a throughbore.

18. The fitting according to claim 8 further comprising a third mating section.

19. A unitary fitting mate and couple with a plurality of T-slot structures, said T-slot structures forming a plurality of recesses, said fitting comprising:

a first mating section comprising:

a first end;

a second end, wherein at least one of said first end and said second end capable of receiving one of said T-slot structures;

an outer surface circumferentially surrounding said T-slot structure;

an inner surface being capable of mating with one of T-slot structures, said inner surfaced having a portion thereof extending inwardly into at least one of said recesses of a respective T-slot structure;

a second mating section comprising:

a first end;

a second end, wherein at least one of said first end and said second end capable of receiving one of said T-slot structures;

an outer surface circumferentially surrounding said T-slot structure;

an inner surface being capable of mating with one of T-slot structures, said inner surfaced having a portion thereof extending inwardly into at least one of said recesses of a respective T-slot structure; and wherein said first section and said second and section being formed as unitary, one-piece fitting, said first and said second section being angled with respect to one another.

20. The fitting according to claim 19 wherein said first mating section and said second section form substantially a 90° angle with respect to one another.

\* \* \* \* \*